United States Patent
Mordini et al.

(10) Patent No.: US 6,805,042 B2
(45) Date of Patent: Oct. 19, 2004

(54) APPARATUS FOR BREWING A BEVERAGE

(75) Inventors: Mauro Dominick Mordini, Parsippany, NJ (US); Michael Charles Cirigliano, Cresskill, NJ (US); Joseph Vaitkus, Greenvale, NY (US)

(73) Assignee: Unilever Bestfoods, North America, division of Conopco, Inc., Englewood Cliffs, NJ (US)

( * ) Notice: Subject to any disclaimer, the term of this patent is extended or adjusted under 35 U.S.C. 154(b) by 0 days.

(21) Appl. No.: 10/142,454

(22) Filed: May 10, 2002

(65) Prior Publication Data

US 2003/0209151 A1 Nov. 13, 2003

(51) Int. Cl.[7] .............................. A47J 31/02; A47J 31/00
(52) U.S. Cl. .............................. 99/299; 99/306; 99/295; 99/323; 99/317
(58) Field of Search .......................... 99/306, 307, 317, 99/319, 322, 295, 284, 323, 299

(56) References Cited

U.S. PATENT DOCUMENTS

| | | | |
|---|---|---|---|
| 3,450,024 A | * | 6/1969 | Martin .......................... 99/295 |
| 3,511,166 A | | 5/1970 | Bixby |
| 3,793,935 A | * | 2/1974 | Martin .......................... 99/295 |
| 4,080,299 A | * | 3/1978 | Bartolome ................... 210/479 |
| 4,739,697 A | | 4/1988 | Roberts |
| 5,064,533 A | | 11/1991 | Anson |
| 5,927,179 A | | 7/1999 | Mordini et al. |
| 5,948,455 A | * | 9/1999 | Schaeffer et al. .............. 426/77 |
| 6,250,209 B1 | | 6/2001 | Pope |
| 6,260,476 B1 | * | 7/2001 | Pope ........................... 99/323 |
| 6,279,460 B1 | * | 8/2001 | Pope ........................... 99/299 |
| 6,305,268 B1 | | 10/2001 | Schamberg et al. |
| 6,393,966 B1 | | 5/2002 | Hart et al. |
| 2001/0053399 A1 | | 12/2001 | Herod |
| 2002/0002908 A1 | | 1/2002 | Clean et al. |

FOREIGN PATENT DOCUMENTS

| | | |
|---|---|---|
| EP | 0 776 166 B1 | 4/2001 |
| FR | 1 554 054 | 12/1968 |

* cited by examiner

Primary Examiner—Reginald L. Alexander
(74) Attorney, Agent, or Firm—Edward A. Squillante, Jr.

(57) ABSTRACT

This invention is directed to an apparatus for brewing a beverage. The apparatus has a brew funnel with an elevation device that enables the end user to brew beverage, hot or cold, with a filter and loose beverage precursor and with beverage precursor packaged within a filter pack.

14 Claims, 5 Drawing Sheets

APPARATUS FOR BREWING A BEVERAGE

FIELD OF THE INVENTION

The present invention is directed to an apparatus for brewing a beverage. More particularly, the invention is directed to an apparatus for brewing a beverage like coffee or tea. The apparatus has a brew funnel with an elevation device whereby the apparatus is suitable to brew a beverage with a filter and loose beverage precursor, and a beverage precursor within a filter pack.

BACKGROUND OF THE INVENTION

Tea, for example, is more sensitive to brewing and often more difficult to brew then coffee. Many establishments that brew tea (i.e., either hot or cold brew) have a tea brewing apparatus that employs a brew funnel which holds filter paper and loose tea leaf whereby water contacts the tea leaf in the filter paper to produce tea for consumption. These establishments enjoy such an apparatus because they are common and result in tea that is, generally, of good quality.

Other vendors convey that it is preferred to brew tea with tea leaf within a filter pack. Filter packs are sometimes enjoyed in lieu of loose tea leaf because they do not require the use of a separate filter and the pouring of loose tea leaf into a brew funnel. While some believe that the brewing of tea with loose tea leaf produces a better tasting tea (i.e., because the water used to brew the tea is able to contact loose tea leaves effectively), others believe that tea made via filter packs is of better quality because tea leaf almost never carries over to the tea product to be consumed, and because apparatuses that use filter packs almost never get clogged with tea leaves.

The different preferences of end users or vendors can make business difficult for suppliers of tea. This is true because suppliers of tea leaf typically supply establishments with both tea leaf in either loose form or in filter packs and tea brewing apparatuses, and filters and loose tea leaf and filter packs cannot be used in the same apparatus. Thus, two different brewing apparatuses must be supplied.

It is of increasing interest to develop a single (i.e., universal) apparatus for brewing beverage that can brew beverage with either a filter and loose beverage precursor and with beverage precursor within a filter pack. This invention, therefore, is directed to an apparatus for brewing beverage and the apparatus has a brew funnel with an elevation device whereby the apparatus is suitable to brew beverage with a filter and loose beverage precursor, and beverage precursor within a filter pack.

Additional Information

Efforts have been disclosed for brewing beverage. In U.S. Pat. No. 5,927,179, an apparatus for quick brewing of tea is described.

Other efforts have been disclosed for brewing beverages. In U.S. Pat. No. 6,305,268, a machine for brewing hot beverages is disclosed.

Still other efforts have been disclosed for brewing beverages. In U.S. Application No. 20020002908 A1, a beverage brewing apparatus with automatic and semi-automatic brewing modes is disclosed.

None of the additional information above describes an apparatus for brewing beverage such that the apparatus has a brew funnel with an elevation device whereby the apparatus is suitable to brew beverage with a filter and loose beverage precursor, and beverage precursor within a filter pack.

SUMMARY OF THE INVENTION

In a first aspect, the present invention is directed to a brew funnel for brewing beverage, the brew funnel for brewing beverage comprising:

(a) a mouth suitable for receiving a filter and loose beverage precursor, and suitable for receiving beverage precursor within a filter pack;

(b) a floor, opposite the mouth, the floor being tapered towards an aperture;

(c) a surrounding wall having a top and bottom portion, the bottom portion being connected to the floor and the top portion forming the mouth of the brew funnel; and (d) an elevation device wherein the brew funnel is suitable for use in a beverage brewing apparatus.

In a second aspect, the present invention is directed to a beverage brewing apparatus comprising the brew funnel of the first aspect of this invention.

In a third aspect, the present invention is directed to a kit for brewing beverage, the kit comprising the beverage brewing apparatus of the second aspect of this invention and instructions that the apparatus can brew beverage with a filter and loose beverage precursor and beverage precursor within a filter pack.

In a fourth aspect, the present invention is directed to a method for making a beverage with the brew funnel of the first aspect of this invention.

Elevation device, as used herein, is defined to mean a device that has a platform, the ability to hold up a filter pack, the ability to hold up the sides of a tea brewing filter, the ability to fit within the brew funnel such that the platform is substantially parallel to the floor of the brew funnel and elevated therefrom, the platform being porous to a liquid (e.g., a platform with at least two holes or perforations but preferably a plurality of holes or perforations).

Beverage precursor, as used herein, is defined to mean a material that can be contacted with water to produce a beverage, such a beverage precursor can be ground coffee or tea leaf.

Beverage, as used herein, is defined to mean a liquid that may be consumed by a human and made with a beverage precursor.

Coffee is defined to mean a beverage derived from a coffee bean including ground coffee.

Tea, as used herein, is meant to include tea derived from *Camillia sinensis*, as well as herbal teas.

Filter is defined to mean a material, like a paper material, that can hold beverage precursor and allow a liquid to pass through.

Filter pack, as used herein, is defined to mean a sealed pack (e.g., made of filter paper) filled with beverage precursor.

BRIEF DESCRIPTION OF THE DRAWINGS

The subject matter which is regarded as the invention is particularly pointed out and distinctly claimed in the concluding portion of the specification. The invention, however, may be best understood by reference to the following description taken in conjunction with the accompanying drawing figures in which:

DETAILED DESCRIPTION OF THE PREFERRED EMBODIMENTS

There is no limitation with respect to the brew funnel that may be used in this invention other than that the brew funnel is one that may be used in an apparatus that can brew beverage and internally can support the elevation device of this invention. Typically, such a brew funnel is made of polymeric material like a polycarbonate, polyester, polyamide, polyphenylene ether, blend thereof, copolymer thereof or the like.

The brew funnel that may be used in the invention herein includes those sold with an apparatus that can brew beverage such as those made commercially available (without the elevation device of this invention) from suppliers like Bunn-O-Matic, Curtis, Cecilware, Hamilton Beach-Proctor Silex, Inc., Newco, Food Equipment Technologies, Inc. and Black and Decker. The most preferred brew funnels are the superior funnels obtainable with the tea brewing apparatuses made commercially available (without the elevation device of this invention) by Unilever Bestfoods and sold under the Lipton Tea Brand.

Regarding the brew funnel of this invention, such a funnel may be used with an apparatus that brews hot or cold beverage. Therefore, the brew funnel may be used in apparatuses that brew beverage with water at a temperature from about 15° C. to about 99° C., with water at a temperature from about 15° C. to about 65° C. when, for example, cold brewed tea (e.g., iced tea) is preferred and from about 80° C. to about 99° C. when, for example, hot brewed tea is preferred.

As to the elevation device, such a device has a porous platform which can fit within and be supported by the brew funnel. The elevation device is suitable to hold up a filter off of the floor of the brew funnel and support the sides of the filter. Thus, the elevation device can hold up and support the sides of the filter to assist in the efficient brewing of beverage. Such an elevation device may also hold up and support beverage precursor within a filter pack to efficiently brew beverage if the end user prefers using filter packs over a filter with loose beverage precursor. It is particularly noted that it is within the scope of this invention to fit existing and conventional brew funnels with the elevation device of this invention so that the conventional brew funnels may be made universal as described herein.

There generally is no limitation with respect to the beverage precursor which may be used in this invention, other than that the beverage precursor may be used to brew beverage with hot or cold water. In an especially preferred embodiment, however, the beverage brewed within the apparatus of this invention is tea brewed from superior tea leaf sold by Unilever Bestfoods under the Lipton Brand.

Figure 1:
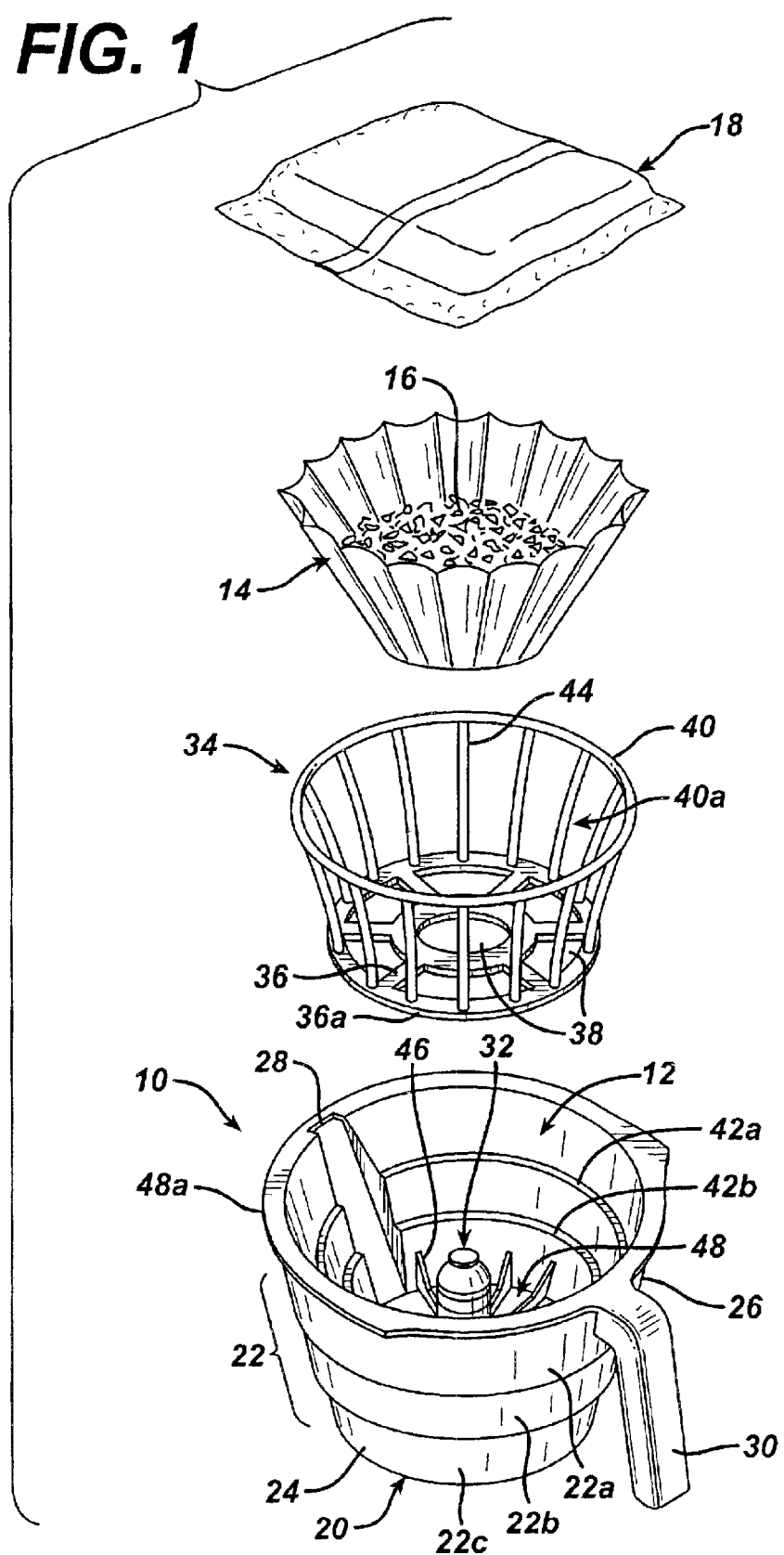
FIG. 1 depicts a brew funnel, a first illustrative elevation device, a filter having loose beverage precursor and a beverage precursor within a filter pack.

Turning to the Figures, FIG. 1 depicts an illustrative brew funnel 10, comprising a mouth 12 suitable for receiving a filter 14 and loose beverage precursor 16, and suitable for receiving beverage precursor within a filter pack 18. The brew funnel 10, also comprises a floor 20 having a diameter that is often at least about 5%, and preferably, at least about 10%, and most preferably, at least about 20% less than the diameter of the mouth 12. The brew funnel 10 further comprises a surrounding wall 22 optionally comprising a plurality of walls (e.g., 22a, 22b and 22c that decrease in diameter from top to bottom). The surrounding wall 22 has a bottom portion 24 connected to the floor 20 and a top portion 26 forming the mouth 12 of the brew funnel 10. Pour spout 28 is located on the anterior portion of the brew funnel 10 so that liquid (not shown) may be removed from the brew funnel after brewing beverage or washing. Handle 30, generally opposite to pour spout 28, is provided to maneuver brew funnel 10, siphon arrangement 32 is provided and operatively associated with a substantially central aperture (depicted in FIG. 2) in the floor 20 of the brew funnel 10. The siphon arrangement 32 initiates capillary action so that the beverage brewed may exit brew funnel 10 near the central aperture at a rate that allows for pasteurization. Brew funnel lip 48a allows for the mounting of the brew funnel 10 on to brewing apparatus depicted in FIG. 5.

Illustrative elevation device 34 is basket-like and fits within brew funnel 10. Elevation device 34 has a platform 36 with outer ridge 36a to rest on inner step 42a or 42b of brew funnel 10, a plurality of perforations 38 and a ridge 40 forming an elevation device mouth 40a. The ridge 40 is connected to the platform 36 via a plurality of spindles 44. In a preferred embodiment, the platform 36 has a diameter that is often at least about 5%, and preferably at least about 10%, and most preferably, at least about 20% less than the diameter of elevation device mouth 40a. In another preferred embodiment, the brew funnel 10 has baffles 46 forming channels 48 to guide beverage towards the aperture. In yet another preferred embodiment, no more than about 50%, and most preferably, no more than about 35% of the volume of the brew funnel 10 is below platform 36 when elevation device 34 is placed within the brew funnel 10. In an especially preferred embodiment, less than about 25% of the total length of the siphon arrangement 32 within the brew funnel 10 protrudes through (i.e., beyond) platform 36 when the elevation device 34 is within the brew funnel 10 and outer ridge 36a is resting on inner step 42a or 42b.

Figure 2:
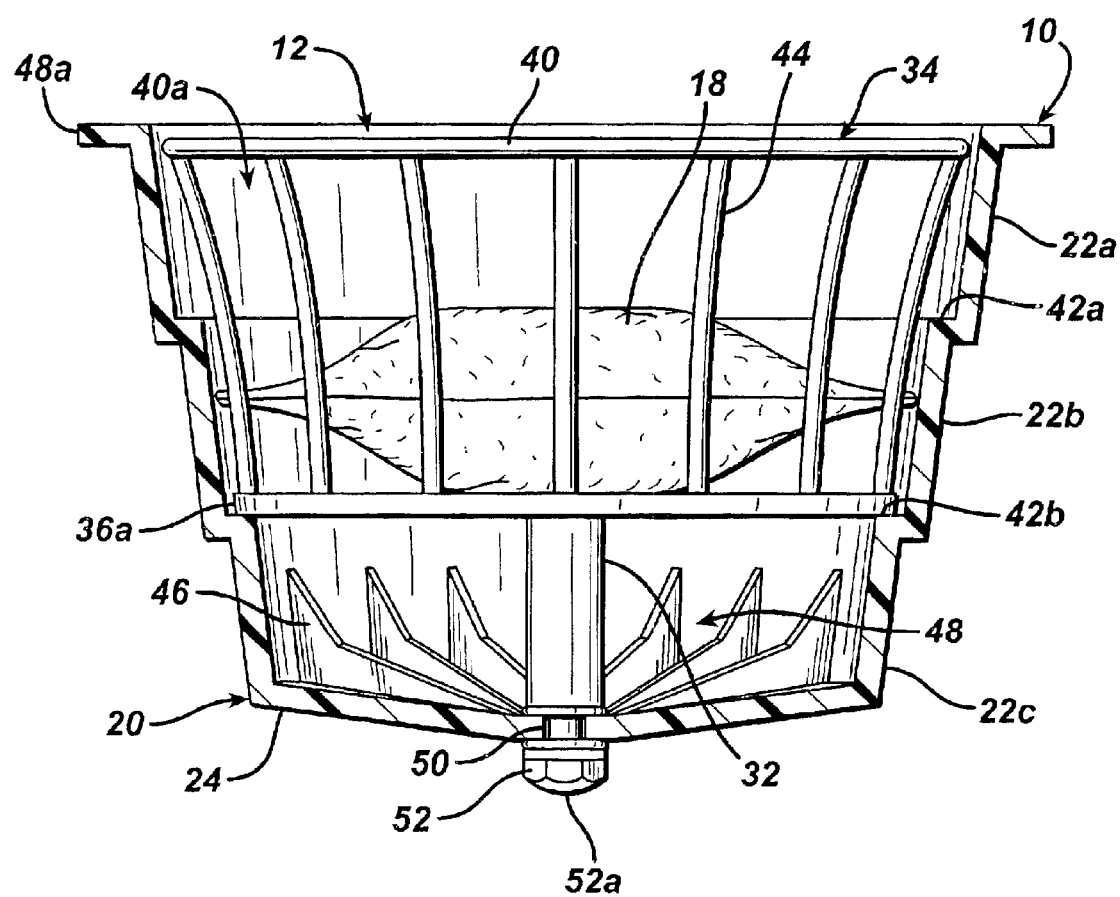
FIG. 2 depicts the first illustrative elevation device within the brew funnel and the filter pack within the elevation device.

FIG. 2 depicts brew funnel 10 (cross-section) with elevation device 34 therein. Elevation device 34 rests within brew funnel 10 by placing outer ridge 36a on (in this illustration) inner step 42b. Filter pack with beverage precursor therein 18 is shown resting within elevation device 34 and on platform 36 so that beverage can be brewed (either hot or cold). Aperture 50 is shown with bottom portion 52 (which is often threaded to mount siphon arrangement 32 to brew funnel 10) of siphon arrangement 32 extending therefrom so that beverage (not shown) and ready for consumption may drain from the exit pore 52a of the siphon arrangement. A more detailed description of how the siphon arrangement 32 operates may be found in U.S. Pat. No. 5,927,179, the disclosure of which in incorporated herein by reference. Moreover, it is particularly noted herein that ridge 40 should not be higher than brew funnel lip 48a when the elevation device 34 is within brew funnel 10. Therefore, the length of the spindles 44 of elevation device 34 has to be taken into consideration and adjusted accordingly.

Figure 3:
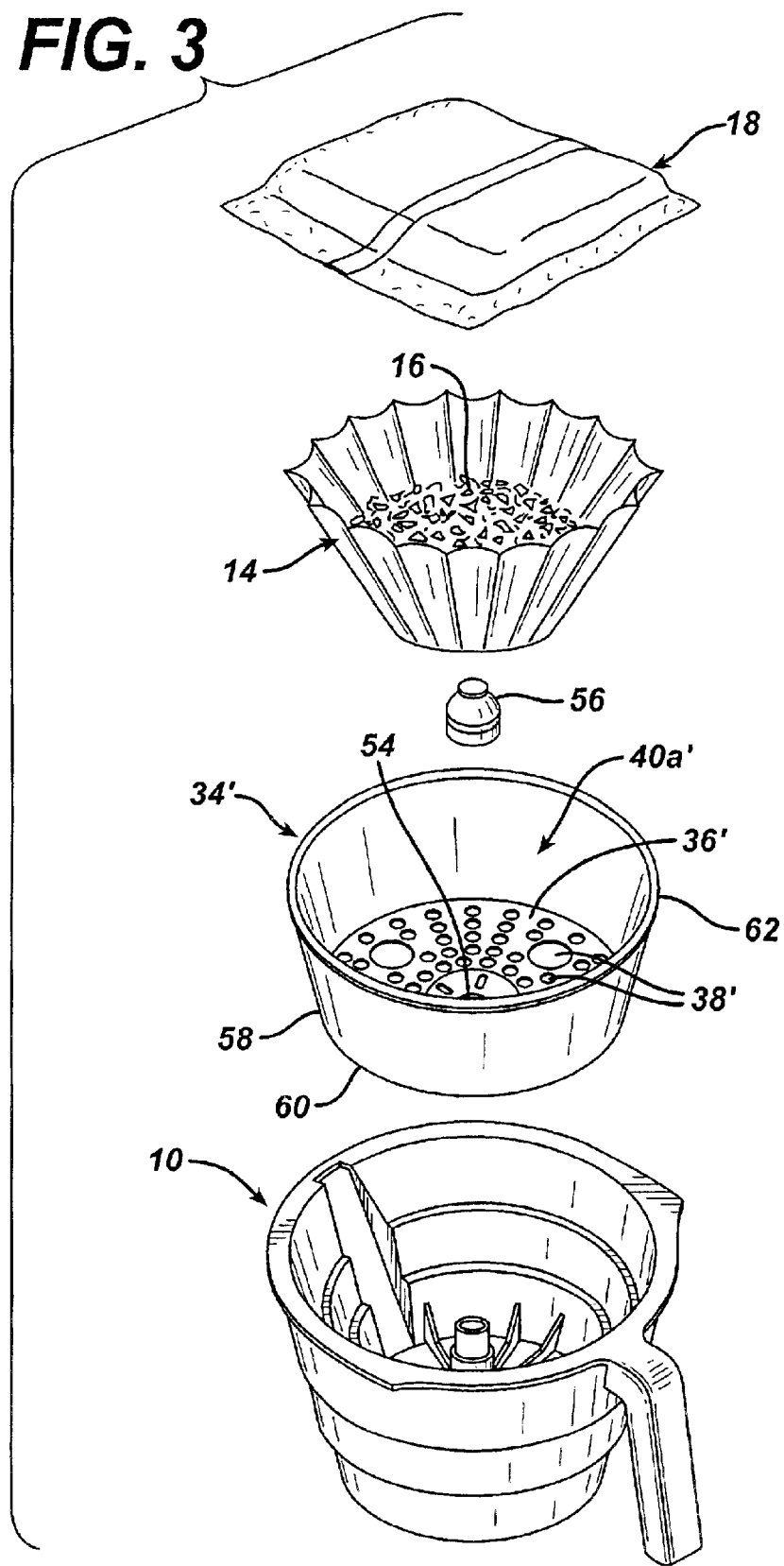
FIG. 3 depicts a brew funnel, a second illustrative elevation device, a filter having loose beverage precursor and beverage precursor within a filter pack.

FIG. 3 shows brew funnel 10 and illustrative elevation device 34' having a platform 36' with a plurality of perforations 38' and a center hole 54 for mounting on to siphon arrangement 32 by securing the elevation device 34' to siphon arrangement 32 via headnut 56. Therefore, the elevation device 34' is supported (within brew funnel 10) in this illustration by siphon arrangement 32 in lieu of inner step 42b as shown in FIG. 2. Similar to elevation device 34, elevation device 34' may be used with a filter 14 having loose beverage precursor 16 or beverage precursor within a filter pack 18. Furthermore, elevation device 34' has a surrounding wall 58 having a bottom wall portion 60 connected to platform 36' and a top wall ridge 62 forming elevation device mouth 40*a'*. The dimensions of elevation device 34' are substantially the same as the dimensions of elevation device 34 as described herein.

Figure 4:
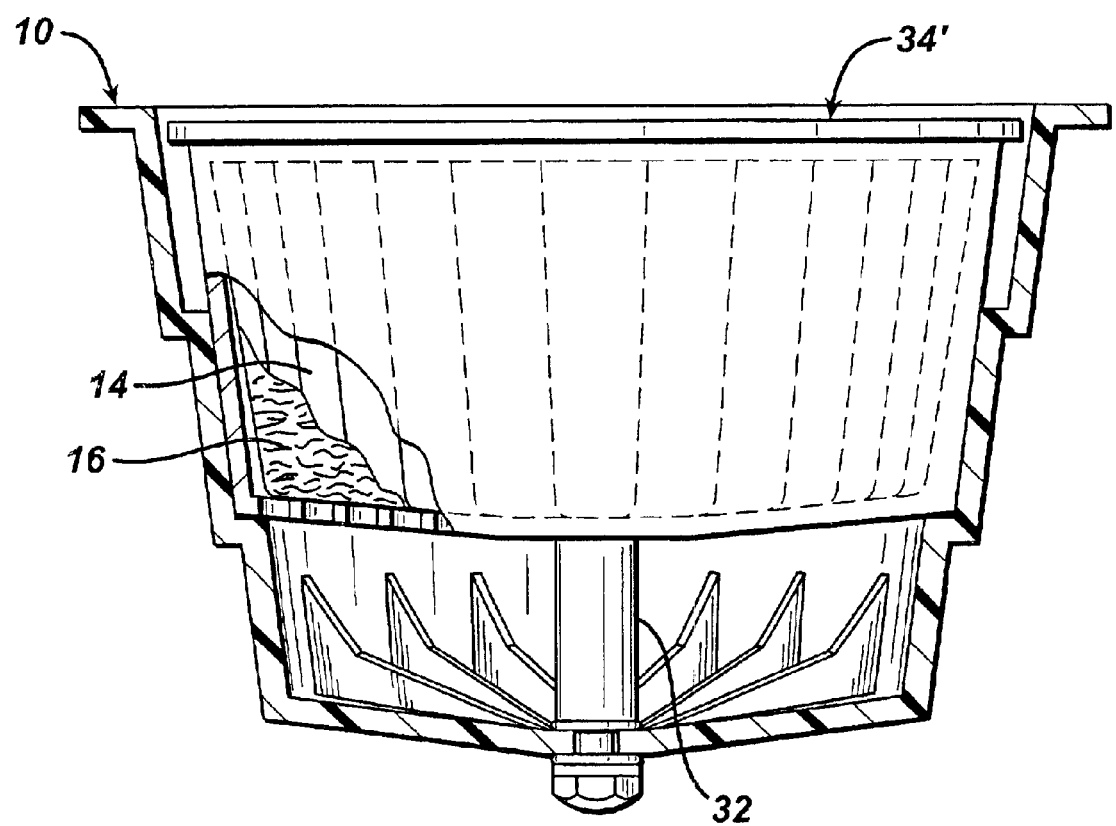
FIG. 4 depicts the second illustrative elevation device within the brew funnel and the filter having loose beverage precursor within the elevation device.

FIG. 4 shows a cross-section of brew funnel 10 with elevation device 34' therein and mounted on siphon arrangement 32. Elevation device 34' is supporting filter 14 having loose beverage precursor 16 therein so that beverage may be brewed, hot or cold.

Figure 5:
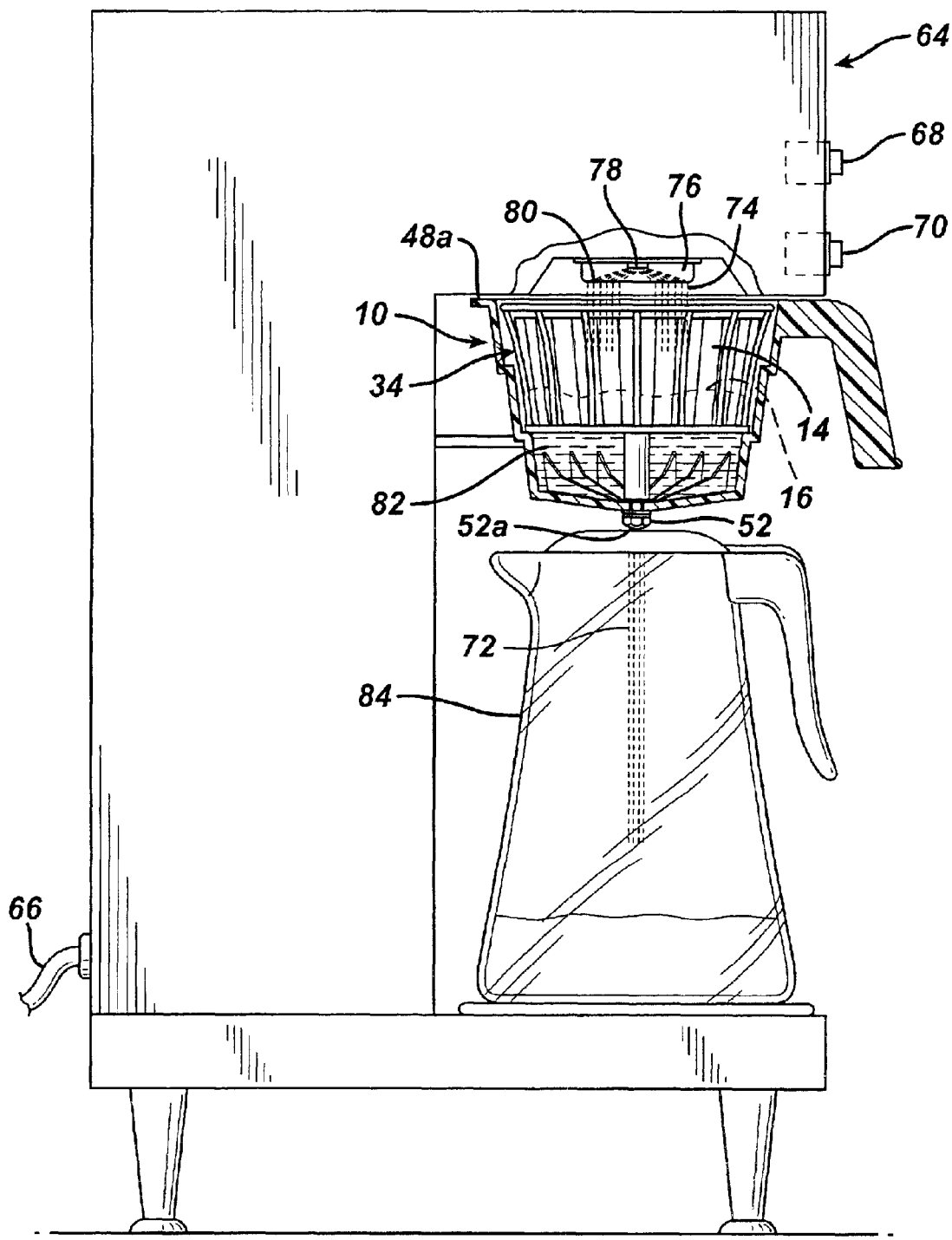
FIG. 5 depicts a side view of the beverage brewing apparatus of this invention.

Turning to FIG. 5, a side view of an illustrative brewing apparatus 64 of this invention is shown. The brewing apparatus 64 has a water supply (not shown) and electrical supply 66. Power switch 68 allows for power to be supplied to the brewing apparatus 64 and brew switch 70 allows for and initiates the brewing of ready for drinking beverage 72. Illustrated in FIG. 5 is brew funnel 10 supported in brewing apparatus 64 by guides (not shown) operatively associated with brew funnel lip 48*a*. Elevation device 34 is placed within brew funnel 10 and a filter (e.g., paper beverage filter) 14 having loose beverage precursor 16 is placed within the elevation device 34. Water 74 is dispensed from dispensing outlet 76 having a water outlet 78 and water holes 80 that direct the water 74 on to beverage precursor 16 within the filter 14 placed in elevation device 34. Pasteurizing beverage 82, when, for example, tea, remains in brew funnel 10 not longer than about 10 minutes, preferably, not longer than about 7 minutes, and most preferably, not longer than about 5 minutes before draining through exit pore 52*a* as ready for drinking tea 72 in to receiving vessel 84.

In operation, (when making tea as described herein) it is particularly noted that when cold brew tea is preferred, the tea leaf employed is typically enzyme treated. Also, from about 50% to about 75% of the total weight of water within the ready to drink tea is added after brewing. When cold brewing tea, typically from about 0.75 ounces to about 1.5 ounces of tea leaf is used for about every 1.0 gallon of tea brewed. When hot brewing tea, typically from about 0.5 ounces to about 1.25 ounces of tea leaf is used for about every 1.0 gallon of tea brewed.

When making coffee, conventional conditions are used and they are similar to the conditions for making tea except that the beverage precursor is, for example, ground coffee comprising and not tea leaf comprising. Thus when making coffee, the temperature of the water and the amount of ground coffee used is comparable to the conditions found in conventional coffee brewing apparatuses, like the Black & Decker® SmartBrew™.

When purchasing the brewing apparatus of this invention, the brewing apparatus may be sold with filters and loose beverage precursor, beverage precursor within filter packs, neither or both. Such a brewing apparatus is, however, provided with instructions that indicate that the superior brewing apparatus of this invention (i.e., a brewing apparatus with a brew funnel having an elevation device therein) can be used to brew superior tasting beverage with beverage precursor in a filter or within a filter pack. It is also within the scope of this invention to sell a kit comprising the elevation device and instructions to use the elevation device in a conventional brew funnel of a brewing apparatus.

What is claimed is:

1. A brew funnel, the brew funnel comprising:
   (a) a mouth suitable for receiving a filter and loose beverage precursor, and suitable for receiving beverage precursor with in a filter pack;
   (b) a floor, opposite the mouth, the floor having an aperture;
   (c) a surrounding wall having a top and bottom portion, the bottom portion being connected to the floor and the top portion forming the mouth of the brew funnel; and
   (d) an elevation device placed and supported therein
   wherein the brew funnel is suitable for use in a beverage brewing apparatus and the elevation device is mounted to a siphon apparatus.

2. The brew funnel according to claim 1 wherein the elevation device has resting therein a filter with loose beverage precursor.

3. The brew funnel according to claim 1 wherein the elevation device has resting therein a filter pack filled with beverage precursor.

4. The brew funnel according to claim 1 wherein the brew funnel has a handle and a pour spout, the handle and pour spout being substantially opposite to each other.

5. The brew funnel according to claim 2 wherein the loose beverage precursor is loose tea leaf that comprises leaf from *Camellia Sinensis*.

6. The brew funnel according to claim 3 wherein the beverage precursor is tea leaf that comprises leaf from *Camellia Sinensis*.

7. The brew funnel according to claim 1 wherein the brew funnel can be used in a brewing apparatus that brews tea at temperatures from about 150° C. to about 99° C.

8. The brew funnel according to claim 1 wherein no more than 50% of brew funnel volume is below the elevation device.

9. The brew funnel according to claim 1 wherein the siphon apparatus is attached to it's the floor.

10. The brew funnel according to claim 1 wherein the brew funnel further comprises at least one inner step on the surrounding wall.

11. The brew funnel according to claim 10 wherein the elevation device rests on the inner step on the surrounding wall.

12. The brew funnel according to claim 2 wherein the loose beverage precursor is ground coffee.

13. The brew funnel according to claim 3 wherein the beverage precursor is ground coffee.

14. An apparatus for brewing beverage, the apparatus comprising:
   (a) a brew funnel comprising:
      (i) a mouth suitable for receiving a filter and loose beverage precursor, and suitable for receiving beverage precursor within a filter pack;
      (ii) a floor, opposite the mouth, the floor having an aperture;
      (iii) a surrounding wall having a top and bottom portion, the bottom portion being connected to the floor and the top portion forming the mouth of the brew funnel; and
      (iv) an elevation device placed and supported therein the elevation device is mounted to a siphon apparatus;
   (b) a water supply to supply water into the brew funnel; and
   (c) a receiving vessel placed under the aperture to capture beverage.

* * * * *